United States Patent
Ijeri et al.

(10) Patent No.: US 12,054,638 B2
(45) Date of Patent: Aug. 6, 2024

(54) TRANSPARENT HYDROPHOBIC AND ICEPHOBIC COMPOSITIONS, COATINGS, AND METHODS

(71) Applicant: THE BOEING COMPANY, Chicago, IL (US)

(72) Inventors: Vijaykumar Ijeri, Mumbai (IN); Stephen P. Gaydos, St. Louis, MO (US); Jill E. Seebergh, Seattle, WA (US); Priyanka G. Dhirde, Mumbai (IN); Anand Sawroop Khanna, Mumbai (IN)

(73) Assignee: The Boeing Company, Arlington, VA (US)

( * ) Notice: Subject to any disclaimer, the term of this patent is extended or adjusted under 35 U.S.C. 154(b) by 712 days.

(21) Appl. No.: 16/528,986

(22) Filed: Aug. 1, 2019

(65) Prior Publication Data

US 2021/0032477 A1 Feb. 4, 2021

(51) Int. Cl.
| | |
|---|---|
| C09D 4/00 | (2006.01) |
| B05D 5/08 | (2006.01) |
| C08G 63/695 | (2006.01) |
| C08K 3/36 | (2006.01) |
| C09D 7/20 | (2018.01) |
| C09D 7/40 | (2018.01) |

(52) U.S. Cl.
CPC .............. *C09D 4/00* (2013.01); *B05D 5/083* (2013.01); *C08G 63/695* (2013.01); *C08K 3/36* (2013.01); *C09D 7/20* (2018.01); *C09D 7/40* (2018.01); *B05D 2201/02* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 3,852,222 A * | 12/1974 | Field | C08G 59/30 528/48 |
| 4,366,075 A * | 12/1982 | Beach | H01B 7/285 508/136 |
| 6,177,582 B1 | 1/2001 | Jenkner et al. | |
| 6,316,572 B1 | 11/2001 | Nambu et al. | |
| 6,809,169 B2 | 10/2004 | Byrd et al. | |
| 8,221,847 B2 | 7/2012 | Carter | |
| 9,845,418 B2 | 12/2017 | Gross et al. | |
| 9,879,153 B2 | 1/2018 | Wang et al. | |
| 2002/0197490 A1 | 12/2002 | Amidaiji et al. | |
| 2004/0202873 A1 | 10/2004 | Shibato et al. | |
| 2007/0003705 A1 | 1/2007 | Strauss | |
| 2007/0181747 A1 | 8/2007 | Byrd et al. | |
| 2011/0147219 A1 | 6/2011 | Lambourne et al. | |
| 2012/0107581 A1 | 5/2012 | Simpson et al. | |
| 2015/0044420 A1 | 2/2015 | Nowak et al. | |
| 2015/0251767 A1 | 9/2015 | Sapper et al. | |
| 2016/0096972 A1 | 4/2016 | Newbloom et al. | |
| 2016/0200953 A1 | 7/2016 | Constantinou et al. | |
| 2017/0015922 A1 | 1/2017 | Gross et al. | |
| 2017/0036241 A1 | 2/2017 | Constantinou et al. | |
| 2018/0002562 A1 * | 1/2018 | Kuroki | E04G 23/02 |
| 2018/0016383 A1 * | 1/2018 | Gross | C09D 7/70 |
| 2018/0201796 A1 | 7/2018 | Hironaga et al. | |

FOREIGN PATENT DOCUMENTS

| | | |
|---|---|---|
| CN | 107254207 A | 10/2017 |
| CN | 107513350 A | 12/2017 |
| CN | 107916069 A | 4/2018 |
| CN | 108047937 A | 5/2018 |
| CN | 108841322 A | 11/2018 |
| CN | 109280411 A | 1/2019 |
| CN | 109957328 A | 7/2019 |
| JP | 2013053305 A | 3/2013 |
| WO | 0114497 A1 | 3/2001 |
| WO | 2008153687 A2 | 12/2008 |
| WO | 2016187569 A1 | 11/2016 |
| WO | 2017196870 A1 | 11/2017 |
| WO | 2018001889 A1 | 1/2018 |
| WO | 2018071349 A1 | 4/2018 |
| WO | 2018073460 A1 | 4/2018 |

OTHER PUBLICATIONS

Datasheet for Cab-O-Sil 720 (Year: 2017).*
European Patent Office Extended European Search Report for Application No. 20187856.8-1102/3771732 dated Dec. 3, 2021.
European Search Report for Application No. 20187860.0-1107 dated Apr. 12, 2020.
Junpeng Liu et al., "Super?Hydrophobic/Icephobic Coatings Based on Silica Nanoparticles Modified by Self? Assembled Monolayers", Nanomaterials, 6 (12), 232, (2016). (doi:10.3390/nano6120232).
D. K. Sarkar and M. Farzaneh, "Superhydrophobic Coatings with Reduced Ice Adhesion" Journal of Adhesion Science and Technology, 23, (2009), 1215-1237.
Golovin et al. "Designing Durable Icephobic Surfaces", Science Advances, vol. 2, No. 3, (2016), 1?12. (doi:10.1126/sciadv. 1501496).

(Continued)

*Primary Examiner* — Robert T Butcher
(74) *Attorney, Agent, or Firm* — Patterson + Sheridan, LLP

(57) ABSTRACT

In certain aspects, a composition includes a monomer binder, a plurality of silica nanoparticles, a surface energy reducing additive, and a blend of a high polarity solvent and a low polarity solvent. The high polarity solvent has a dipole moment of about 1.2 or greater, and the low polarity solvent has a dipole moment of about 0.7 or less. In certain aspects, a coated substrate includes a substrate and a coating over the substrate. The substrate is selected from a group consisting of glass, polycarbonate, polyacrylate, and polyethylene terepthalate. The coating includes a polymer binder, a plurality of nanoparticles, and a surface energy reducing additive. The coated substrate has a transparency of at least about 80% light transmission at one or more wavelengths in a range of 380 nm to 740 nm.

20 Claims, 1 Drawing Sheet

(56) References Cited

OTHER PUBLICATIONS

Kim et al., "Liquid? Infused Nanostructured Surfaces with Extreme Anti?Ice and Anti?Frost Performance" ACS Nano, vol. 6, No. 8, (2012), 6569-6577. (doi:10.1021/nn302310q).
S.A. Kulinich, M. Farzaneh, "Ice Adhesion on Super?Hydrophobic Surfaces", Applied Surface Science, 255 (2009) 8153-8157. (doi:10.1016/j.apsusc.2009.05.033).
Prashanth Sagar Reddy Beeram, Rye M. Waldman, and Hui Hu. "Measurements of Ice Adhesion over Ice Mitigation Coatings Pertinent to Aircraft Icing and Anti?/De?Icing", 9th AIAA Atmospheric and Space Environments Conference, AIAA Aviation Forum, (2017), 1?15. (doi: 10.2514/6.2017?3928).
Machine Translation of JP 2013-053305, retrieved Mar. 25, 2022.
European Patent Office, European Search Report for European Patent Application No. 23212816.5, dated Jan. 11, 2024.

\* cited by examiner

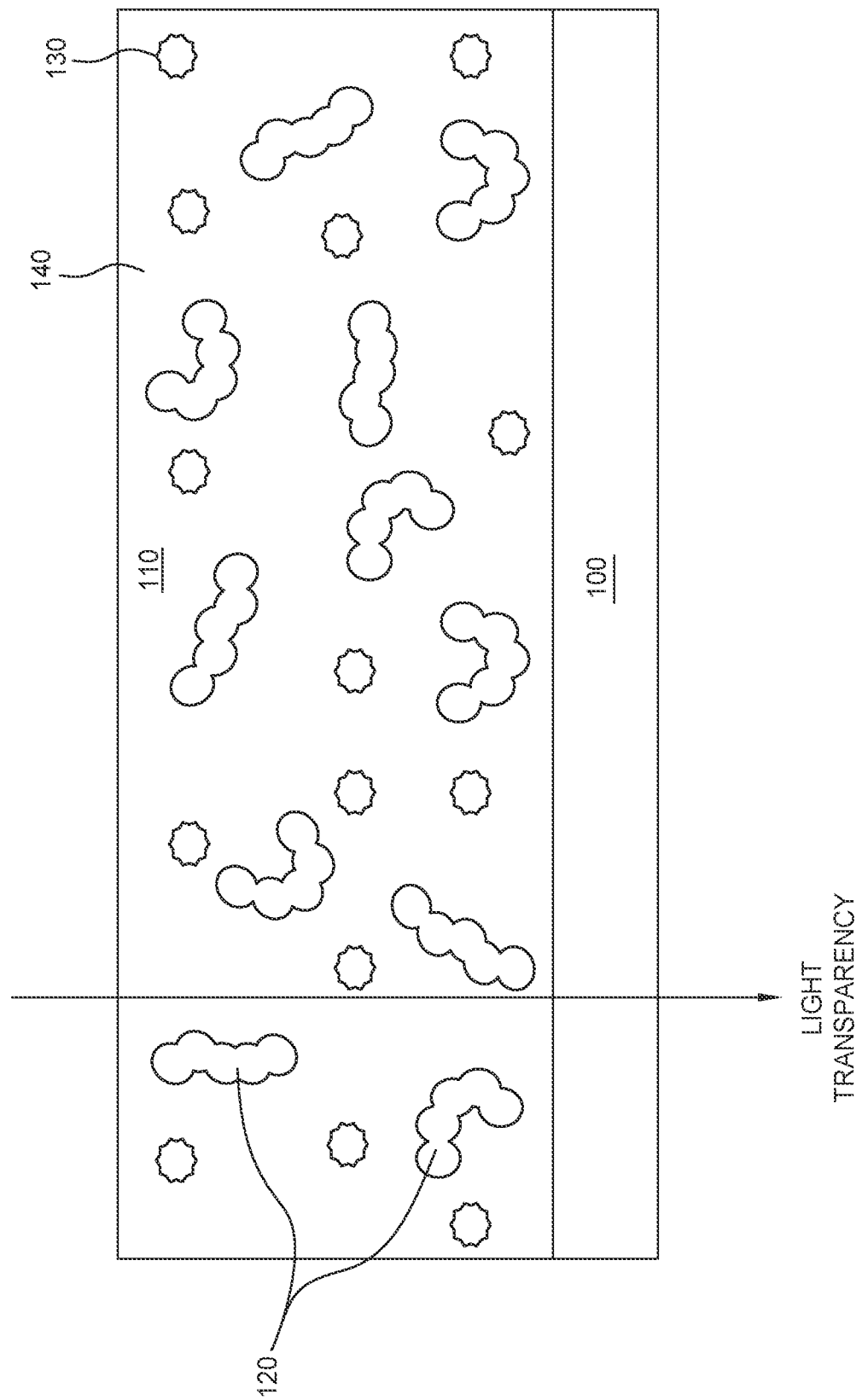

TRANSPARENT HYDROPHOBIC AND ICEPHOBIC COMPOSITIONS, COATINGS, AND METHODS

FIELD

Aspects generally relate to transparent hydrophobic and icephobic compositions, coatings, and methods.

BACKGROUND

The everyday buildup of ice upon the surfaces of structures, such as power lines, buildings, and signs, which might compromise those structures. The ice accumulated upon industrial, agricultural, and other mechanical equipment makes operation of the equipment difficult or impossible. Ice accumulation upon vehicles, such as air, land, and marine vehicles, poses a challenging problem. For example, ships traveling in cold climates may have ice formed thereon, thereby disadvantageously increasing the weight and decreasing the maneuverability of the ships.

The buildup of ice upon the wings and components of aircrafts degrades aircraft performance and poses a safety concern. The lift generated by the wings, and thus the ability of the aircraft to become and remain airborne, is dependent on the shape of the wings. Even a small accumulation of ice upon the surface of the wings can significantly increase drag and dramatically reduce lift. Furthermore, ice buildup along control surfaces of the aircraft can impede the movement of those surfaces and prevent proper control of the aircraft.

One method of de-icing aircraft surfaces involves electromechanical methods, such as wipers, and/or thermal energy, such as embedded heating elements, to break or melt the ice. However, these mechanical and heating anti-icing devices to breakup and shed the accumulated ice consume high levels of electrical energy. Another method of de-icing aircraft surfaces involves de-icing fluids to remove or prevent ice adhesion on aircraft surfaces. However, de-icing fluids are effective for a short duration and are not environmentally preferred. Still another method of de-icing aircraft surfaces involves low surface energy waxes. However, low surface energy waxes reduce the clarity and visibility of windows and may not be environmentally preferred.

One approach of de-icing aircraft surfaces is the proposed use of hydrophobic coatings including silica nanoparticles. However, such hydrophobic coatings reduce the transparency of transparent substrate, such as aircraft windshields.

Therefore, there is a need for a transparent durable surface coating with long lasting hydrophobic and icephobic properties.

SUMMARY

In certain aspects, a composition includes a monomer binder, a plurality of silica nanoparticles, a surface energy reducing additive, and a blend of a high polarity solvent and a low polarity solvent. The high polarity solvent has a dipole moment of about 1.2 or greater, and the low polarity solvent has a dipole moment of about 0.7 or less.

In certain aspects, a coated substrate includes a substrate and a coating over the substrate. The substrate is selected from a group consisting of glass, polycarbonate, polyacrylate, and polyethylene terephthalate. The coating includes a polymer binder, a plurality of nanoparticles, and a surface energy reducing additive. The coated substrate has a transparency of at least about 80% light transmission at one or more wavelengths in a range of 380 nm to 740 nm.

In certain aspects, a method of forming a hydrophobic-icephobic coating over a substrate includes mixing a monomer binder, a plurality of nanoparticles, a surface energy reducing additive, and an organic solvent to form a hydrophobic-icephobic composition. The hydrophobic-icephobic composition is applied over the substrate. The hydrophobic-icephobic composition is cured to form a hydrophobic-icephobic coating over the substrate. The hydrophobic-icephobic coating comprises the monomer binder from about 90% to about 98%, the nanoparticles from about 1 weight % to about 5 weight %, and the surface energy reducing additive from 1% weight to about 5 weight percent %. The organic solvent does not etch the substrate during application of the hydrophobic-icephobic composition over the substrate.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, may admit to other equally effective aspects.

The FIGURE is a schematic diagram of a cured hydrophobic-icephobic coating over a transparent substrate.

To facilitate understanding, identical reference numerals have been used, where possible, to designate identical elements that are common to the FIGURES. It is contemplated that elements and features of one aspect may be beneficially incorporated in other aspects without further recitation.

DETAILED DESCRIPTION

Some aspects will now be described in greater detail below, including specific aspects, versions and examples, but the present disclosure is not limited to these aspects, versions or examples, which are included to enable a person having ordinary skill in the art to make and use aspects, when the information in the present disclosure is combined with available information and technology.

Various terms as used herein are defined below. To the extent a term used in a claim is not defined below, it should be given the broadest definition persons in the pertinent art have given that term as reflected in one or more printed publications or issued patents.

All documents described herein are incorporated by reference herein, including any priority documents and/or testing procedures to the extent they are not inconsistent with this text. As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," and "consisting of." The terms "comprising," "consisting essentially of," "consisting of" also include the product of the combinations of elements listed after the term.

Compositions, coatings, and methods of forming a coating which are both hydrophobic and icephobic (referred to herein as "hydrophobic-icephobic") are provided. Hydrophobic coatings over a surface reduce water accumulation and hence reduce the growth of ice due to the freezing of the accumulated water. Icephobic coatings over a surface reduce or prevent ice accumulation by providing low ice adhesion strength of ice to the surface. The icephobic coatings passively reduce or prevent ice accumulation without any active power source by shear forces causing the ice to shed from the surface due to the low ice adhesion strength. In contrast, electro-mechanical and/or thermal energy de-icing devices actively reduce or prevent ice accumulation by using an active power source.

The hydrophobic-icephobic coatings can be formed as the topcoats of transparent substrates. A transparent substrate can include one or more of glass, polycarbonate, polyacrylate, polyethylene terephthalate, or other transparent substrates. The transparent substrates can be hard or soft and/or flexible or rigid. The transparent substrate can include an intermediate coating or layer formed thereover, such as a coating or layer to prevent or reduce crack growth in the transparent substrate.

The hydrophobic-icephobic coatings are applied, formed, or deposited over the transparent substrate and cause reduced or no etching or hazing of the transparent substrate. The transparent hydrophobic-icephobic coated substrates of both the hydrophobic-icephobic coating and the substrate can have a total transparency of at least about 80% light transmission at one or more wavelengths of from 380 nm to 740 nm, such as at least about 85%, at least about 90%, at least about 95%, or at least about 99% light transmission. These coating transparencies are measured through the hydrophobic-icephobic coating and through the transparent substrate.

The hydrophobic-icephobic coatings can be formed over a transparent substrate by applying a hydrophobic-icephobic composition. The hydrophobic-icephobic composition comprises a monomer binder, a plurality of nanoparticles, a surface energy reducing additive, an organic solvent, and an optional hardener.

A monomer binder when polymerized forms a transparent polymer binder. The monomers may comprise methyl methacrylate monomers, urethane monomers, silicone monomers, other suitable monomers, and combinations thereof. The transparent polymer binder can be acrylic, acrylic-polyurethane, acrylic-silicone, other suitable transparent polymers, and combinations thereof. The monomer binder can be polymerized by a hardener or other suitable polymerization agent, by electromagnetic radiation, or by combinations thereof.

The applied hydrophobic-icephobic composition is cured to form a hydrophobic-icephobic coating by evaporating the organic solvent. The applied hydrophobic-icephobic composition can be cured in ambient temperatures and ambient conditions. For example, the applied hydrophobic-icephobic composition can be air cured in ambient conditions for about 1 hour or less. Since the hydrophobic-icephobic composition can be cured in ambient conditions, complicated heat curing can be avoided. After curing and after polymerization, the applied hydrophobic-icephobic coating can be resistant to degradation from ultraviolet (UV) radiation.

The hydrophobic-icephobic coatings after curing comprises the nanoparticles in an amount from about 0.1 weight % to about 10 weight %, such as from about 1 weight % to about 5 weight %. The nanoparticles can be silica, alumina, ceria, zirconia, titania, zinc oxide, fluoropolymer particles, and combinations thereof. These nanoparticles create a nanoroughness to the coating increasing hydrophobicity of the coating and will not impart color to coating. One example of fluoropolymer particles are particles of polytetrafluoroethylene. In certain aspects, the nanoparticles are surface modified silica nanoparticles.

The nanoparticles can have a mean particle size from about 3 nm to about 100 nm in diameter, such as from about 5 nm to about 50 nm. A mean particle size of 5 nm or greater helps to provide hydrophobic properties to a coating containing the nanoparticles. A mean particle size of about 50 nm or less helps to maintain transparency and clarity of coating containing the nanoparticles. Nanoparticles of a large mean particle size may cause hazing or loss of transparency over a transparent substrate.

The nanoparticles can be modified by a surface treatment or by functionalization to increase hydrophobicity of the nanoparticles. Possible surface treatments include coating alkylsilanes, alkylsiloxanes, fluoroalkylsilanes, fluoroalkylsiloxanes, other surface treatments, and combinations thereof over a surface of the nanoparticles. Possible functionalization includes linking alkylsilanes, alkylsiloxanes, fluoroalkylsilanes, fluoroalkylsiloxanes, and combinations thereof to a surface of the nanoparticles.

The nanoparticles can be fumed or unfumed, precipitated or unprecipitated, colloidal or non-colloidal, porous or nonporous, modified or unmodified, structured and non-structured, and/or natural or synthetic. For example, the nanoparticles can be fumed, unprecipitated, non-colloidal, low or no porosity, modified, structured, synthetic nanoparticles. Synthetic nanoparticles can be manufactured with good control over the desired properties. For example, fumed nanoparticles can be produced with low or no porosity and/or with chain-branch structure. Structured nanoparticles, such as chain-branch functionalized nanoparticles, help to provide hydrophobicity. In certain aspects, the nanoparticles are fumed, unprecipitated, non-colloidal low or no porosity, surface modified, structured silica nanoparticles.

The surface energy reducing additive can be fluoropolymers, silanes, siloxanes, other surface energy reducing additives, and blends thereof. The surface energy reducing additivities increase the hydrophobicity of the hydrophobic-icephobic coating. The surface energy reducing additive can be present in the cured hydrophobic-icephobic coating from about 0.1 weight % to about 20 weight %, such as from about 1 weight % to about 5 weight %. If the hydrophobic-icephobic composition includes too small an amount of the surface energy reducing additive, the resulting coating may not be sufficiently hydrophobic. If the hydrophobic-icephobic composition includes too large an amount of the surface energy reducing additive, de-wetting of the coating from the substrate may occur due to too large a ratio of surface energy reducing additive to monomer binder.

The hydrophobic-icephobic composition can comprise an organic solvent to uniformly disperse the nanoparticles and the surface energy reducing additives throughout the monomer binder. Uniform dispersion of the nanoparticles and the surface energy reducing additives throughout the monomer binder with the organic solvent further includes mixing, stirring, and sonication of the mixture.

The organic solvent can include a mixture of a polar solvent, such as n-butyl acetate, and a non-polar solvent, such as mixed xylenes. For example, the polar solvent has a dipole moment of about 1.2 or greater, such 1.5 or greater. For example, the non-polar solvent has a dipole moment of about 0.7 or less, such as about 0.4 or less. Dipole moments of solvents are found in *CRC Handbook of Chemistry and*

*Physics*, 85<sup>th</sup> ed; Lide, D. R. ED., CRC Press, 2004-2005, pp. 9-45 to 9-51. The polar solvent helps to disrupt the hydrogen bonding of the nanoparticles to reduce agglomeration of the nanoparticles. With less agglomeration, the nanoparticles are more uniformly dispersed within the hydrophobic-icephobic composition. The hydrophobic-icephobic composition can comprise a non-polar solvent and a polar solvent in a ratio from about 1:1 to 1:10. If a non-polar solvent is used alone, undesirable etching or hazing of the transparent substrate may occur.

The hydrophobic-icephobic composition of monomer binder, nanoparticles, a surface energy reducing additive, organic solvent, and an optional hardener is applied to a surface of a transparent substrate to form a hydrophobic-icephobic coating. The hydrophobic-icephobic coating is applied to a surface of a transparent substrate by brushing, rolling, dipping, drenching, wiping, spraying, or other suitable application technique. The hydrophobic-icephobic composition can be sprayed onto a surface of a transparent substrate since the composition contains a mixture of organic solvents, which increases the flash point.

The FIGURE is a schematic diagram of a cured hydrophobic-icephobic coating 110 over a transparent substrate 100. The transparent substrate 100 can be an aircraft windshield, an aircraft window, an aircraft navigation light lens, a radome, electronics display covers, automobile windshield, automobile windows, and other transparent substrates.

The hydrophobic-icephobic coating 110 includes nanoparticles 120 and surface energy reducing additive 130 dispersed within a polymer binder 140. The nanoparticles 120 are fumed nanoparticles with chain-branched structure. Fumed chain-branched nanoparticles help to provide hydrophobicity and icephobicity to the coating. Chain-branched nanoparticles easily agglomerate due to hydrogen bonding. Due to the polar organic solvent of the hydrophobic-icephobic composition, the nanoparticles are uniformly dispersed within the hydrophobic-icephobic composition since the polar organic solvent disrupts the hydrogen bonding of the nanoparticles. Reduced or no agglomeration of the nanoparticles helps to providing a transparent coating.

The hydrophobic-icephobic coatings 110 of FIG. 1 can be formed to have one or more properties that are useful as a topcoat of a transparent substrate 100 for use in an aircraft or in other applications.

The hydrophobic-icephobic coating can have a water contact angle of about 100° or greater, such as about 110° or greater. The water contact angle is the angle measured through the liquid where a liquid-vapor interface meets a flat solid surface. The water contact angle measures the wettability of a solid surface by a liquid via the Young equation as shown in equation (1):

$$\gamma_{SG} = \gamma_{SL} + \gamma_{LG} \cos \theta_C \quad (1)$$

wherein $\theta_C$ is the water contact angle, $\gamma_{SG}$ is the solid-gas interfacial tension, $\gamma_{SL}$ is the sold-liquid interfacial tension, and $\gamma_{LG}$ is the liquid-gas interfacial tension. The hydrophobic-icephobic coatings have a high water contact angle and a low wetting over a transparent substrate 100. When a surface has a water contact angle of 100° or greater, water more easily rolls off the surface resulting in less water that can freeze into ice. The water contact angle was determined by ASTM D 7334.

The hydrophobic-icephobic coatings can have a water sliding angle of about 40° or less. such as about 30° or less. The sliding angle is defined as angle between the surface and the horizontal plane at which a water drop starts to slide off the surface under the influence of gravity by utilizing a titling table device. The sliding angle can indicate the self-cleaning ability of a coating. Lower the sliding angle, the greater the self-cleaning ability of the coating to remove water resulting in less water that can freeze into ice. The water sliding angle was determined by ASTM D 7334.

The hydrophobic-icephobic coating can have an ice adhesion strength ($\tau_{ice}$) of about 60 kPA or less. Ice adhesion strength is measured as follows. A coated sample is placed on a cooling plate. The temperature of the plate is maintained at −20° C. To bond ice with the substrate, a small amount of water is dropped on the coated substrate and then ice cubes are placed over them, allowing them to fuse together. This system is kept steady for 1 hour. Using a force transducer, the force required to detach the ice cube from the surface of the coated substrate is measured using a digital force gauge.

The ice adhesion strength determines the ability of the hydrophobic-icephobic coating to provide self de-icing of accumulated ice over a transparent substrate by shearing action. The shearing action can be the airflow across the transparent substrate, acceleration/deceleration of the transparent substrate, mechanical force applied to the accumulated ice, such as by wipers or by fluids, other shearing action, or combinations thereof. The lower the ice adhesion strength the greater the self de-icing of accumulated ice over the transparent substrate since the accumulated ice more easily falls off from the transparent substrate. Due to the unique nature of water and ice, a hydrophobic coating can be either icephobic or icephilic. An ice adhesion strength property is one parameter than can determine whether a hydrophobic coating is also icephobic.

The hydrophobic-icephobic coatings with the additional silica nanoparticles over transparent substrate can also have one or more of the following properties which shows that coatings have good durability. The hydrophobic-icephobic coating can have an excellent coating adhesion strength with a rating of 5B as determined under ASTM D 3359 over a transparent polyacrylate/polycarbonate substrate. A high coating adhesion grade shows that the hydrophobic-icephobic coating has high adhesion to polyacrylate/polycarbonate transparent substrate. The hydrophobic-icephobic coating can have a Taber abrasion value of about 13 mg or less of weight loss, with a load of 1 Kg, 1000 cycles, using CS10 abrasive wheels as measured by ASTM D 4060. A Taber abrasion value of a low amount of material loss (mg) shows that the hydrophobic-icephobic coating is resistant to abrasion and that the hydrophobic-icephobic coating is durable. The hydrophobic-icephobic coating can pass 500 hrs of a UV light exposure test under ASTM G 154 with a change in gloss and color of the hydrophobic-icephobic coating of about 2% or less. Passing the UV light exposure test shows that the hydrophobic-icephobic coating has little or no degradation from exposure to sunlight. Based on these test results, the hydrophobic-icephobic coating can have a long lifetime once applied over a transparent substrate. For example, the hydrophobic-icephobic coating can have good durability over a transparent substrate, such as over a transparent substrate of an aircraft. After the lifetime expiration of the hydrophobic-icephobic coating, after damage to the hydrophobic-icephobic coating, or after a partial application of the hydrophobic-icephobic coating to a substrate, a second hydrophobic-icephobic coating can be applied or reapplied over the initial hydrophobic-icephobic coating substrate to provide a renewed hydrophobic-icephobic coating.

The hydrophobic-icephobic coating can be formed from a hydrophobic-icephobic composition manufactured at low cost. The nanoparticles, surface energy reducing additives, organic solvent of the hydrophobic-icephobic composition are commercially available. For example, silica nanoparticles are available from Evonik Industries of Greensboro, NC. For example, organic solvents are available from Sigma-Aldrich Corp of St. Louis, MO. For example, surface energy reducing additives are available from Dow Chemicals of Mumbai, India or from Megachem of Mumbai, India.

The hydrophobic-icephobic coating can be formed from a hydrophobic-icephobic composition of environmentally benign materials. For example, the silica nanoparticles have been recognized as safe by the FDA for use in cosmetics and food additives. For example, the surface energy additives are not known carcinogens.

The hydrophobic-icephobic coating may be utilized alone or in combination with other de-icing devices, such as electro-mechanical devices thermal energy devices, de-icing fluids, and/or lower surfaces energy waxes. The hydrophobic-icephobic coating minimizes the shear force required for the ice to fall off the hydrophobic-icephobic coating.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Aspects

The present disclosure provides, among others, the following aspects, each of which may be considered as optionally including any alternate aspects.

Clause 1. A composition, comprising a monomer binder, a plurality of silica nanoparticles, a surface energy reducing additive, and a blend of a high polarity solvent and a low polarity solvent. The high polarity solvent having a dipole moment of about 1.2 or greater and the low polarity solvent has a dipole moment of about 0.7 or less.

Clause 2. The composition according to any of the clauses 1 and 3-5, wherein the monomer binder is selected from a group consisting of acrylic, acrylic-urethane, acrylic-silicone, and combinations thereof.

Clause 3. The composition according to any of the clauses 1-2 and 4-5, wherein the surface energy reducing additive is selected from a group consisting of fluoropolymers, silanes, siloxanes, and blends thereof.

Clause 4. The composition according to any of the clauses 1-3 and 5, wherein the silica nanoparticles are fumed surface modified silica nanoparticles.

Clause 5. The composition according to any of the clauses 1-4, wherein the silica nanoparticles comprises a mean particle size from about 5 nm to about 50 nm.

Clause 6. A coated substrate, comprising a substrate and a coating over the substrate. The substrate is selected from a group consisting of glass, polycarbonate, polyacrylate, and polyethylene terephthalate. The coating comprises a polymer binder, a plurality of nanoparticles, and a surface energy reducing additive. The coated substrate has a transparency of at least about 80% light transmission at one or more wavelengths from 380 nm to 740 nm.

Clause 7. The coated substrate according to any of the clauses 6 and 8-14, wherein the coating comprises the nanoparticles in an amount from about 0.1 weight % to about 10 weight %.

Clause 8. The coated substrate according to any of the clauses 6-7 and 9-14, wherein the coating comprises the surface energy reducing additive is an amount from about 0.1 weight % to about 20 weight %.

Clause 9. The coated substrate according to any of the clauses 6-8 and 10-14, wherein the coating has a water contact angle of about 100° or more.

Clause 10. The coated substrate according to any of the clauses 6-9 and 11-14, wherein the coating has a water contact angle of about 110° or more.

Clause 11. The coated substrate according to any of the clauses 6-10 and 12-14, wherein the coating has a water slide off angle of about 40° or less.

Clause 12. The coated substrate according to any of the clauses 6-11 and 13-14, wherein the coating has a water slide off angle of about 30° or less.

Clause 13. The coated substrate according to any of the clauses 6-12 and 14, wherein the coating has an ice adhesion strength of about 60 kPa or less.

Clause 14. The coated substrate according to any of the clauses 6-13, wherein the nanoparticles are fumed, unprecipitated, non-colloidal, low porosity, surface modified, and chain-branched structured.

Clause 15. A method of forming a hydrophobic-icephobic coating over a substrate comprising mixing a monomer binder, a plurality of nanoparticles, a surface energy reducing additive, and an organic solvent to form a hydrophobic-icephobic composition. The hydrophobic-icephobic composition is applied over the substrate. The hydrophobic-icephobic composition is cured to form a hydrophobic-icephobic coating over the substrate. The hydrophobic-icephobic coating comprises the monomer binder from about 90% to about 98%, the nanoparticles from about 1 weight % to about 5 weight %, and the surface energy reducing additive from 1% weight to about 5 weight percent %. The organic solvent does not etch the substrate.

Clause 16. The method according to any of the clauses 15 and 17-20, wherein curing the hydrophobic-icephobic composition comprises evaporating the organic solvent from the hydrophobic-icephobic composition applied to the substrate.

Clause 17. The method according to any of the clauses 15-16 and 18-20, wherein the organic solvent comprises mixed xylenes and n-butyl acetate in a ratio from about 1:1 to 1:10.

Clause 18. The method according to any of the clauses 15-17 and 19-20, wherein the hydrophobic-icephobic composition is cured at an ambient temperature to about 40° C.

Clause 19. The method according to any of the clauses 15-18 and 20, wherein the substrate is an aircraft windshield.

Clause 20. The method according to any of the clauses 15-19, wherein applying the hydrophobic-icephobic composition comprises reapplying the hydrophobic-icephobic composition over a prior hydrophobic-icephobic coating.

EXAMPLES

Example 1

A hydrophobic-icephobic composition was prepared by adding silica nanoparticles of Aerosil grade R 8200 from Evonik Industries of Mumbai, India in an amount of 1.5 wt.

% to 50 ml acrylic-urethane monomers while stirring. The acrylic-urethane monomer binder was from Khamir Industries of Mumbai, India. The acrylic-urethane monomer binder was a water soluble hybrid system. A fluoro based surface energy reducing additive Chemguard FE 2000 from Megachem of Mumbai, India was added in amount of 4.0 ml to the acrylic-urethane silica mixture. The mixture was allowed to stir for 30 minutes followed by ultra-sonication for 90 minutes for continuous and smooth dispersion of the nanoparticles and surface energy reducing additive within the monomer binder.

The composition was diluted with 37.5 ml of butyl acetate and 112.5 ml of xylene. The xylene and butyl acetate were from Sigma-Aldrich Corp of St. Louis, MO. The diluted composition was mixed and then further sonicated for 120 minutes.

The composition was applied over a glass substrate and cured at ambient conditions for one hour. The thickness of the hydrophobic-icephobic topcoat was about 5 μm. The water contact angle of the hydrophobic-icephobic coating was about 115°. The water sliding angle of the hydrophobic-icephobic coating was about 30°.

Example 2

A hydrophobic-icephobic composition was prepared by adding silica nanoparticles of Aerosil grade R 8200 from Evonik Industries of Mumbai, India in an amount of 1.5 wt. % to 50 ml acrylic-urethane polymer while stirring. The acrylic-urethane monomer binder was from Khamir Industries of Mumbai, India. The acrylic-urethane monomer binder was a water soluble hybrid system. A surface energy reducing additive of silane/siloxane blend based DC 88 from Dow Chemicals of Mumbai, India. was added to the acrylic-urethane silica mixture. The mixture was allowed to stir for 30 min followed by ultra-sonication for 90 minutes for continuous and smooth dispersion of the nanoparticles and surface energy reducing additive within the monomer binder.

The composition was diluted with 112.5 ml of butyl acetate and 37.5 ml of xylene. The xylene and butyl acetate were from Sigma-Aldrich Corp of St. Louis, MO. The diluted composition was mixed and then further sonicated for 120 minutes.

The composition was applied over a transparent polycarbonate substrate from Lexan from Sabic of Riyadh, Saudi Arabia. The composition was cured at ambient conditions for one hour. The thickness of the hydrophobic-icephobic topcoat was about 5 μm. The water contact angle of the hydrophobic-icephobic coating was about 108°. The water sliding angle of the hydrophobic-icephobic coating was about 22°. The ice adhesion strength of the hydrophobic icephobic coating was about 50 kPa.

The adhesion of the hydrophobic-icephobic coating had a rating of 5B as determined under ASTM D 3359. The Taber abrasion for the hydrophobic-icephobic coating was a value of 11 mg under ASTM D 4060 with a 1 Kg load, 1000 cycles, and CS10 abrasive wheels. The hydrophobic-icephobic coating passed 500 hrs of a UV light exposure test under ASTM G 154. The change in gloss and color of the hydrophobic-icephobic coating was 2% or less of it original valves after 500 hrs of UV light exposure.

Example 3

A hydrophobic-icephobic composition was prepared by adding silica nanoparticles of Aerosil grade R 8200 from Evonik Industries of Mumbai, India in an amount of 1.5 wt. % to 50 ml acrylic-urethane polymer while stirring. The acrylic-urethane monomer binder was from Khamir Industries of Mumbai, India. The acrylic-urethane monomer binder was a water soluble hybrid system. A surface energy reducing additive of silane/siloxane blend based DC 88 from Dow Chemicals of Mumbai, India. was added to the acrylic-urethane silica mixture. The mixture was allowed to stir for 30 min followed by ultra-sonication for 90 minutes for continuous and smooth dispersion of the nanoparticles and surface energy reducing additive within the monomer binder.

The composition was diluted with 112.5 ml of butyl acetate and 37.5 ml of xylene. The xylene and butyl acetate were from Sigma-Aldrich Corp of St. Louis, MO. The diluted composition was mixed and then further sonicated for 120 minutes.

The composition was applied over a transparent polyacrylate substrate from Perspex from Perspex International of Lancashire, United Kingdom. The composition was cured at ambient conditions for one hour. The thickness of the hydrophobic-icephobic topcoat was about 5 μm. The water contact angle of the hydrophobic-icephobic coating was about 106°. The water sliding angle of the hydrophobic-icephobic coating was about 22°. The ice adhesion strength of the hydrophobic icephobic coating was about 80 kPa.

The adhesion of the hydrophobic-icephobic coating had a rating of 5B as determined under ASTM D 3359. The Taber abrasion for the hydrophobic-icephobic coating was a value of 13 mg under ASTM D 4060 with a 1 Kg load, 1000 cycles, and CS10 abrasive wheels. The hydrophobic-icephobic coating passed 500 hrs of a UV light exposure test under ASTM G 154. The change in gloss and color of the hydrophobic-icephobic coating was 2% or less of it original valves after 500 hrs of UV light exposure.

While the foregoing is directed to aspects of the present disclosure, other and further aspects of the disclosure may be devised without departing from the basic scope thereof, and the scope thereof is determined by the claims that follow.

What is claimed is:

1. A coated substrate, comprising:
    a substrate selected from a group consisting of glass, polycarbonate, polyacrylate, and polyethylene terephthalate; and
    a cured coating over the substrate, the cured coating consisting of:
        a polymer binder,
        a first plurality of particles comprising fumed chain-branched silica nanoparticles in an amount of about 0.1 weight % to about 10 weight %, and
        a second plurality of particles comprising a fluoropolymer disposed thereon, the second plurality of particles further comprising about 0.1 weight % to about 10 weight % of the cured coating, wherein the flouropolymer comprises about 1 weight % to about 5 weight % of the cured coating; and
    wherein the coated substrate has a transparency of at least about 80% light transmission at one or more wavelengths from 380 nm to 740 nm and a water contact angle of about 100° or more.

2. The coated substrate of claim 1, wherein the total amount of the first plurality of particles and the second plurality of particles comprises about 0.1 weight % to about 10 weight % of the cured coating.

3. The coated substrate of claim 1, wherein the cured coating has a water contact angle of about 110° or more.

4. The coated substrate of claim 1, wherein the cured coating has a water slide off angle of about 40° or less.

5. The coated substrate of claim 1, wherein the cured coating has a water slide off angle of about 30° or less.

6. The coated substrate of claim 1, wherein the cured coating has an ice adhesion strength of about 60 kPa or less.

7. The coated substrate of claim 1, wherein the cured coating comprises the first plurality of particles in an amount of about 1 weight % to about 5 weight %.

8. The coated substrate of claim 1, wherein the cured coating comprises the second plurality of particles in an amount of about 1 weight % to about 5 weight %.

9. The coated substrate of claim 1, wherein the particles of the first plurality of particles independently comprise a mean particle size of about 3 nm to about 100 nm and the particles of the second plurality of particles independently comprise a mean particle size of about 3 nm to about 100 nm.

10. The coated substrate of claim 9, wherein the particles of the first plurality of particles comprise a mean particle size of about 5 nm to about 50 nm.

11. The coated substrate of claim 1, wherein the polymer binder is derived from one or more monomers selected from the group consisting of methyl methacrylate monomers, urethane monomers, silicone monomers, and combinations thereof.

12. The coated substrate of claim 1, wherein the polymer binder is selected from the group consisting of an acrylic binder, an acrylic-polyurethane binder, an acrylic-silicone binder, and combinations thereof.

13. The coated substrate of claim 1, wherein the polymer binder comprises an acrylic-polyurethane binder.

14. The coated substrate of claim 1, wherein the polymer binder comprises about 90 weight % to about 98 weight % of the cured coating.

15. The coated substrate of claim 1, wherein the coated substrate has a coating adhesion strength rating of 5B, wherein the coating adhesion strength rating is determined under ASTM D 3359.

16. The coated substrate of claim 1, wherein the coated substrate has a Taber abrasion value of about 13 mg or less of weight loss, wherein the Taber abrasion value is determined under ASTM D 4060.

17. The coated substrate of claim 1, wherein the coated substrate has a change in gloss and color of about 2% or less of its original value after 500 h of UV light exposure.

18. The coated substrate of claim 1, wherein the substrate is selected from a group consisting of an aircraft windshield, an aircraft window, an aircraft navigation light lens, a radome, an automobile windshield, and an automobile window.

19. The coated substrate of claim 1, wherein the substrate is glass.

20. The coated substrate of claim 19, wherein the glass is at least a portion of an aircraft windshield.

* * * * *